(12) United States Patent
York et al.

(10) Patent No.: US 8,012,016 B2
(45) Date of Patent: Sep. 6, 2011

(54) SQUAD COMMAND INTERFACE FOR CONSOLE-BASED VIDEO GAME

(75) Inventors: James R. J. York, Austin, TX (US); Randy J. Pagulayan, Seattle, WA (US); Tim V. Fields, Austin, TX (US)

(73) Assignee: Microsoft Corporation, Redmond, WA (US)

( * ) Notice: Subject to any disclaimer, the term of this patent is extended or adjusted under 35 U.S.C. 154(b) by 689 days.

(21) Appl. No.: 11/832,567

(22) Filed: Aug. 1, 2007

(65) Prior Publication Data

US 2008/0215981 A1    Sep. 4, 2008

Related U.S. Application Data

(62) Division of application No. 10/269,500, filed on Oct. 11, 2002, now Pat. No. 7,594,847.

(51) Int. Cl.
*A63F 13/02* (2006.01)
*A63F 13/10* (2006.01)

(52) U.S. Cl. ............................................. 463/31; 463/37

(58) Field of Classification Search ................. 463/2, 7, 463/30–32, 36–38, 49–57; 434/16–24
See application file for complete search history.

(56) References Cited

U.S. PATENT DOCUMENTS

| | | | |
|---|---|---|---|
| 2,941,915 A | 6/1960 | Manning | |
| 3,005,055 A | 10/1961 | Mattke | |
| 4,029,915 A | 6/1977 | Ojima | |
| 4,256,931 A | 3/1981 | Palisek | |
| 4,493,992 A | 1/1985 | Geller | |
| 4,521,014 A | 6/1985 | Sitrick | |
| 4,572,509 A | 2/1986 | Sitrick | |
| 4,575,591 A | 3/1986 | Lugaresi | |
| 4,687,200 A | 8/1987 | Shirai | |
| 4,896,003 A | 1/1990 | Hsieh | |
| 4,947,461 A | 8/1990 | Yoshioka et al. | |
| 4,992,631 A | 2/1991 | Gee | |
| 5,034,574 A | 7/1991 | Martovitz | |
| 5,164,554 A | 11/1992 | Ikunami | |
| 5,296,845 A | 3/1994 | Haller | |
| 5,343,219 A | 8/1994 | DuBosque, Jr. | |
| 5,640,179 A | 6/1997 | Lake | |
| 5,704,837 A | 1/1998 | Iwasaki et al. | |
| 5,714,981 A | 2/1998 | Scott-Jackson et al. | |
| 5,745,717 A * | 4/1998 | Vayda et al. | 715/834 |
| 5,790,820 A * | 8/1998 | Vayda et al. | 715/834 |
| 5,798,760 A * | 8/1998 | Vayda et al. | 715/834 |
| 5,804,781 A | 9/1998 | Okabe | |
| 5,807,175 A | 9/1998 | Davis et al. | |
| 5,874,906 A | 2/1999 | Willner et al. | |

(Continued)

FOREIGN PATENT DOCUMENTS

JP    11197359    7/1999

OTHER PUBLICATIONS

"Conflict: Desert Storm" for Xbox manual, downloaded from www.replacementdocs.com, May 5, 2010.*

(Continued)

*Primary Examiner* — David L Lewis
*Assistant Examiner* — Matthew D. Hoel

(57) ABSTRACT

A squad command interface for a squad-based shooter video game maps character selection and command selection to actuators on a game controller. Players can select squad characters and issue a single order to multiple characters with few controller actuations.

19 Claims, 14 Drawing Sheets

U.S. PATENT DOCUMENTS

| | | | |
|---|---|---|---|
| 6,175,358 B1 | 1/2001 | Scott-Jackson et al. | |
| 6,241,524 B1* | 6/2001 | Aoshima et al. | 434/118 |
| 6,267,674 B1 | 7/2001 | Kondo et al. | |
| 6,270,413 B1 | 8/2001 | Aikawa et al. | |
| 6,428,411 B1 | 8/2002 | Togami | |
| 6,538,635 B1* | 3/2003 | Ringot | 345/156 |
| 6,628,266 B1 | 9/2003 | Barrowclough et al. | |
| 6,717,569 B1 | 4/2004 | Gruhl et al. | |
| 6,903,724 B2 | 6/2005 | Grivas et al. | |
| 6,925,611 B2* | 8/2005 | SanGiovanni | 715/834 |
| 6,967,642 B2* | 11/2005 | SanGiovanni | 715/702 |
| 6,994,626 B1* | 2/2006 | D'Achard Van Enschut | 463/31 |
| 7,461,355 B2* | 12/2008 | SanGiovanni | 715/854 |
| 2001/0003713 A1 | 6/2001 | Willner et al. | |
| 2001/0029202 A1* | 10/2001 | Kondo et al. | 463/31 |
| 2002/0006817 A1 | 1/2002 | Kobayashi | |
| 2002/0039922 A1 | 4/2002 | Nelson | |
| 2002/0070918 A1 | 6/2002 | Grivas et al. | |
| 2002/0082080 A1* | 6/2002 | Kojima | 463/31 |
| 2002/0098890 A1 | 7/2002 | Sakaguchi | |
| 2002/0103025 A1 | 8/2002 | Murzanski et al. | |
| 2002/0129535 A1 | 9/2002 | Osborn, II | |
| 2003/0130023 A1* | 7/2003 | Angel | 463/13 |
| 2007/0270226 A1 | 11/2007 | York et al. | |

OTHER PUBLICATIONS www.teamxbox.com review of "Conflict: Desert Strom," downloaded from http://games.teamxbox.com/xbox/34/Conflict-DesertStorm/, Feb. 27, 2006 in parent case U.S. Appl. No. 10/269,500.*

Screenshots from http://xboxmedia.ign.com/xbox/image/ directory for "Conflict: Desert Storm" for Xbox: conflo8_640w.jpg, conflo10_640w.jpg, conflo11_640w.jpg, conflo5_640w.jpg, conflo6_640w.jpg, and conflo7_640w.jpg, downloaded on Jun. 3rd, 2010.*

"cube media", http://cubemedia.ign.com/cube/image/gcndesertstormc4.jpg, p. 1.

"Machine Translation of JP11-197359", Retrieved from <http://dossier1.ipd.inpit.go.ip>, Application No. JP10-004275,(Jun. 17, 2009).

"Manual for Command & Conquer PC Game", www.replacementdocs.com, (Jan. 14, 2009).

"Manual for Starcraft PC Game", www.replacementdocs.com, (Jan. 14, 2009).

"Notice of Allowance", U.S. Appl. No. 10/269,500, (Jul. 14, 2009), 17 pages.

"Notice of Allowance", U.S. Appl. No. 10/269,500, (Jul. 14, 2009), 17 pages.

"Conflict Desert Storm", *Xbox Manual*, downloaded from www.replacementdocs.com,(Feb. 27, 2006).

"FM 7-8", vvvvw.globalsecurity.org/military/library/fm/7-8/ch2.htm, (Mar. 1, 2001).

"swat close quarters battle", www.replacementdocs.com, (Apr. 26, 2007).

"Team xbox preview Conflict Desert Storm", games.teamxbox.com/xbox/34/conflict-desert-storm/, (Sep. 30, 2002).

"Swat "close quarters combat"", pc.ign.com/objects/011/011663.html, (Nov. 23, 1999).

"Non-Final Office Action", U.S. Appl. No. 11/832,577, (May 21, 2010),10 pages.

"Final Office Action", U.S. Appl. No. 11/832,577, (Sep. 2, 2010),12 pages.

"Non-Final Office Action", U.S. Appl. No. 11/832,577, (Nov. 12, 2010), 17 pages.

"Final Office Action", U.S. Appl. No. 11/832,577, (Mar. 7, 2011),6 pages.

"Notice of Allowance", U.S. Appl. No. 11/832,577, (Jun. 27, 2011),10 pages.

* cited by examiner

SQUAD COMMAND INTERFACE FOR CONSOLE-BASED VIDEO GAME

CROSS REFERENCE TO RELATED APPLICATIONS

This application claims priority under 35 U.S.C. §120 as a divisional to U.S. patent application Ser. No. 10/269,500, filed Oct. 11, 2002 now U.S. Pat. No. 7,594,847 and titled "Squad Command Interface for Console-Based Video Game", the entire disclosure of which is hereby incorporated by reference in its entirety.

TECHNICAL FIELD

This invention relates to video games for console-based gaming systems, and more particularly, to an interface that enables a player to interact with a squad of characters in a shooter video game.

BACKGROUND

One genre of video games is known as "shooter" games, in which players engage in forms of combat using various weapons. Within the shooter genre, the game may be developed in a first person context, in which the player views the scenes through the eyes of the shooter. Alternatively, the game may be architected in a third person context, where the player views the scenes from a camera viewpoint removed from each character.

Some shooter games enable the player to control squads of characters, rather than just a single character. The player can give an order to a selected character of the squad, and that character carries out the orders without direct intervention from the player. Representative squad-based games include Poject Eden, which is developed by Core Design Ltd. and published by Eidos Interactive for Sony's Playstation® game system, and X-Squad, which is developed and published by Electronic Arts for Sony's Playstation® game console.

In previous squad-based, third person shooter games, the interfaces used for issuing a command to a squad member were cumbersome. In some games, the interfaces were implemented as a series of pull down menus that the player had to traverse in order to assign a particular command to a specific character.

Accordingly, there is a need for an improved interface for issuing commands to a squad of characters in a shooter video game.

SUMMARY

A squad command interface for a squad-based shooter video game is described. The squad command interface maps character selection and command selection to actuators on a handheld game controller to facilitate efficient and intuitive operation. Players can select squad characters and issue a single order to multiple characters with few controller actuations.

In the described implementation, the squad command interface has a squad status display and a command change user interface. The squad status display is persistently visible during combat action and is located in a non-focal region of the screen. It depicts character profiles of the squad characters in a graphical arrangement that maps the profiles to a first actuator (e.g., a directional-pad) on the controller. The squad status display identifies a current command being carried out by each squad character, as well as the character's health.

The command change user interface can be selectively invoked by a player when the player wishes to issue a new command to one or more squad characters. When invoked, the command change interface shows an enlarged squad status display that is repositioned at center screen adjacent to a command option menu. The command option menu has graphical icons representative of possible commands that may be issued to the characters. The command icons are graphically arranged to map onto another actuator (e.g., a set of surface buttons) on the controller. In this manner, the player can intuitively select one or more characters using the first actuator and issue commands to selected characters using the second actuator.

BRIEF DESCRIPTION OF THE DRAWINGS

The same numbers are used throughout the disclosure and figures to reference like components and features.

DETAILED DESCRIPTION

The following disclosure describes a user interface for a squad-based, third person shooter video game. The user interface allows a player to issue commands to one or more squad members and hence, is referred to as the squad command interface. The squad command interface maps character selection and command selection to actuators on a handheld game controller to facilitate efficient and intuitive operation. Through the interface, a player can simultaneously issue the same command to multiple squad characters.

For discussion purposes, the squad command interface is described in the context of a third-person shooter video game for a console-based gaming system. The gaming system will be described first, followed by a discussion of the squad command interface.

Gaming System

Figure 1:
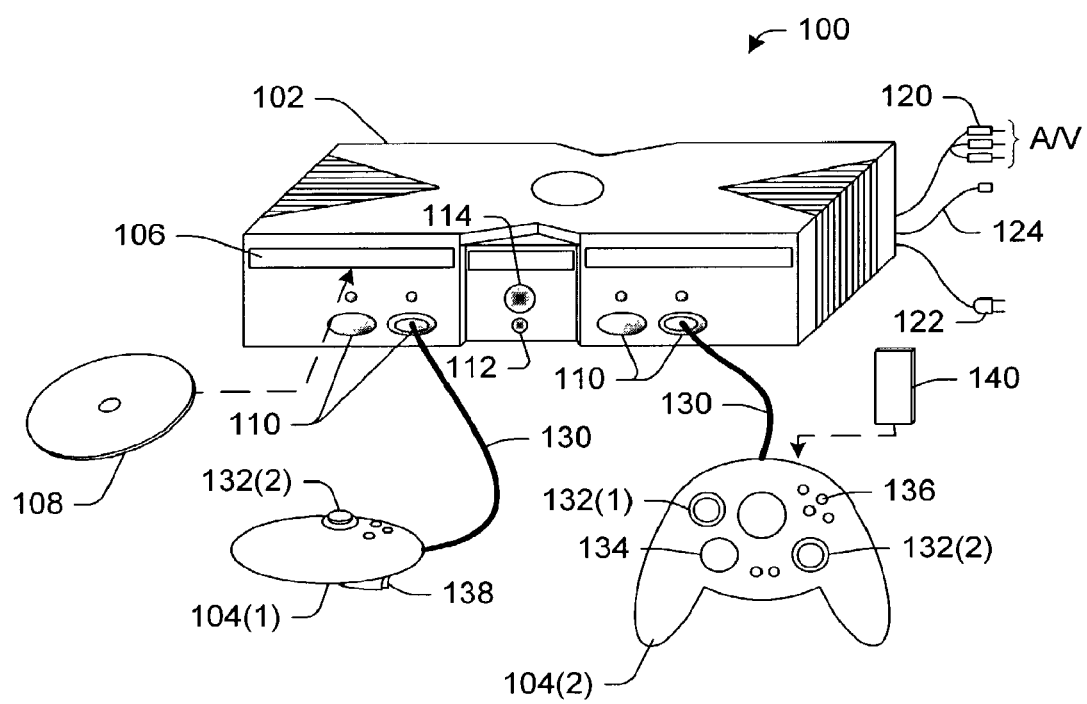
FIG. 1 illustrates a gaming system with a game console and one or more controllers.

FIG. 1 shows an exemplary gaming system 100. It includes a game console 102 and up to four controllers, as represented by controllers 104(1) and 104(2). The game console 102 is equipped with an internal hard disk drive and a portable media drive 106. The portable media drive 106 supports various forms of portable storage media as represented by optical storage disc 108. Examples of suitable portable storage media include DVD, CD-ROM, game discs, game cartridges, and so forth.

The game console 102 has four slots 110 on its front face to support up to four controllers, although the number and arrangement of slots may be modified. A power button 112 and an eject button 114 are also positioned on the front face of the game console 102. The power button 112 switches power to the game console and the eject button 114 alternately opens and closes a tray of the portable media drive 106 to allow insertion and extraction of the storage disc 108.

The game console 102 connects to a television or other display (not shown) via A/V interfacing cables 120. A power cable 122 provides power to the game console. The game console 102 may further be equipped with internal or externally added network capabilities, as represented by the cable or modem connector 124 to facilitate access to a network, such as a local area network (LAN) or the Internet.

Each controller 104 is coupled to the game console 102 via a wire or wireless interface. In the illustrated implementation, the controllers are USB (Universal Serial Bus) compatible and are connected to the console 102 via serial cables 130. The controller 102 may be equipped with any of a wide variety of user interaction mechanisms. As illustrated in FIG. 1, each controller 104 is equipped with two thumbsticks 132(1) and 132(2), a directional or D-pad 134, surface buttons 136, and two triggers 138. These mechanisms are merely representative, and other known gaming mechanisms may be substituted for or added to those shown in FIG. 1.

A memory unit (MU) 140 may be inserted into the controller 104 to provide additional and portable storage. Portable memory units enable users to store game parameters and transport them for play on other consoles. In the described implementation, each controller is configured to accommodate two memory units 140, although more or less than two units may be employed in other implementations.

The gaming system 100 is capable of playing, for example, games, music, and videos. With the different storage offerings, titles can be played from the hard disk drive or the portable medium 108 in drive 106, from an online source, or from a memory unit 140. A sample of what the gaming system 100 is capable of playing back includes:

1. Game titles played from CD and DVD discs, from the hard disk drive, or from an online source.
2. Digital music played from a CD in the portable media drive 106, from a compressed file on the hard disk drive (e.g., Windows Media Audio (WMA) format), or from online streaming sources.
3. Digital audio/video played from a DVD disc in the portable media drive 106, from a file on the hard disk drive (e.g., Windows Media Video (WMV) format), or from online streaming sources.

Figure 2:
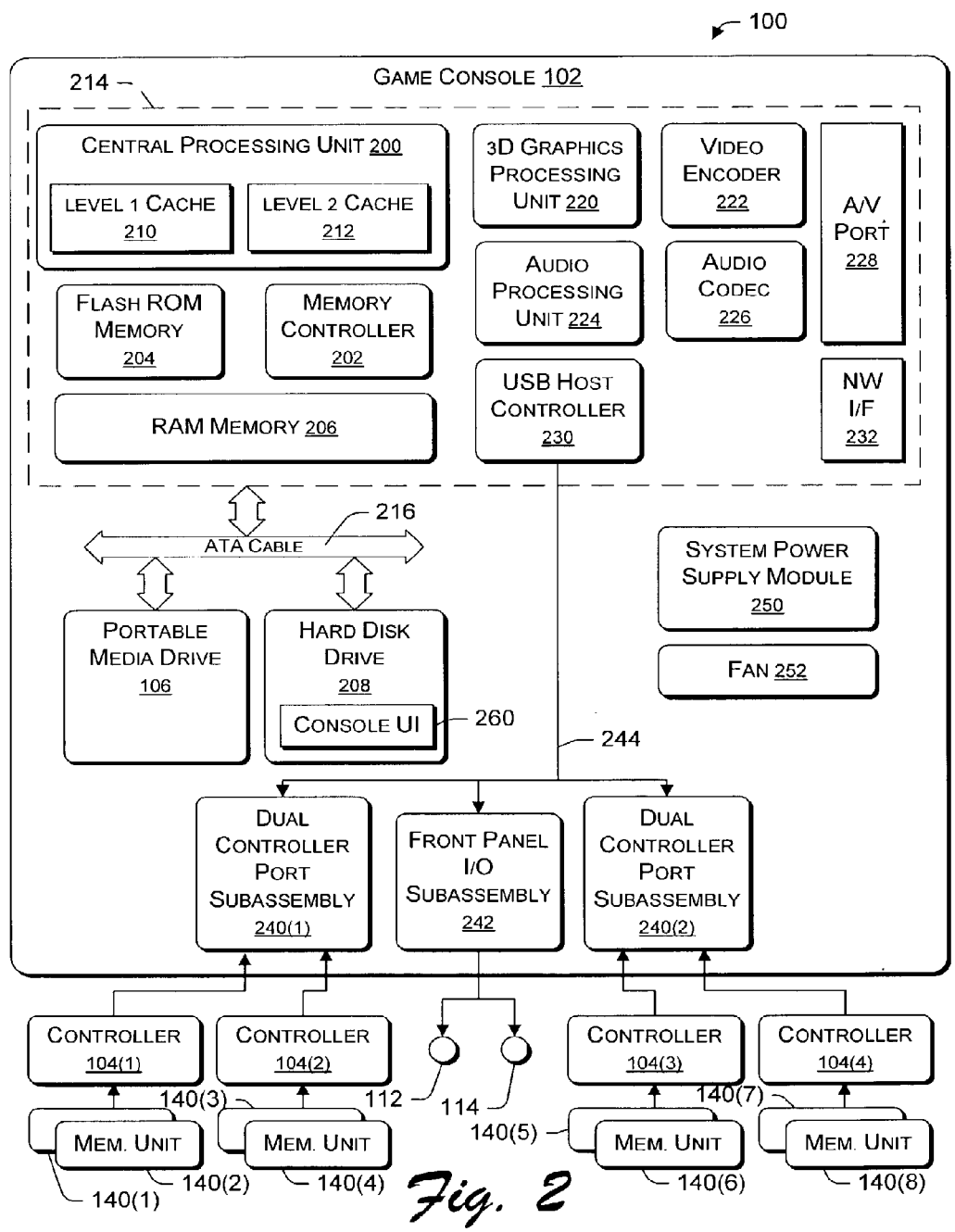
FIG. 2 is a block diagram of the gaming system that is capable of supporting a squad-based shooter video game.

FIG. 2 shows functional components of the gaming system 100 in more detail. The game console 102 has a central processing unit (CPU) 200 and a memory controller 202 that facilitates processor access to various types of memory, including a flash ROM (Read Only Memory) 204, a RAM (Random Access Memory) 206, a hard disk drive 208, and the portable media drive 106. The CPU 200 is equipped with a level 1 cache 210 and a level 2 cache 212 to temporarily store data and hence reduce the number of memory access cycles, thereby improving processing speed and throughput.

The CPU 200, memory controller 202, and various memory devices are interconnected via one or more buses, including serial and parallel buses, a memory bus, a peripheral bus, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnect (PCI) bus.

As one suitable implementation, the CPU 200, memory controller 202, ROM 204, and RAM 206 are integrated onto a common module 214. In this implementation, ROM 204 is configured as a flash ROM that is connected to the memory controller 202 via a PCI (Peripheral Component Interconnect) bus and a ROM bus (neither of which are shown). RAM 206 is configured as multiple DDR SDRAM (Double Data Rate Synchronous Dynamic RAM) modules that are independently controlled by the memory controller 202 via separate buses (not shown). The hard disk drive 208 and portable media drive 106 are connected to the memory controller via the PCI bus and an ATA (AT Attachment) bus 216.

A 3D graphics processing unit 220 and a video encoder 222 form a video processing pipeline for high speed and high resolution graphics processing. Data is carried from the graphics processing unit 220 to the video encoder 222 via a digital video bus (not shown). An audio processing unit 224 and an audio codec (coder/decoder) 226 form a corresponding audio processing pipeline with high fidelity and stereo processing. Audio data is carried between the audio processing unit 224 and the audio codec 226 via a communication link (not shown). The video and audio processing pipelines output data to an A/V (audio/video) port 228 for transmission to the television or other display. In the illustrated implementation, the video and audio processing components 220-228 are mounted on the module 214.

Also implemented on the module 214 are a USB host controller 230 and a network interface 232. The USB host controller 230 is coupled to the CPU 200 and the memory controller 202 via a bus (e.g., PCI bus) and serves as host for the peripheral controllers 104(1)-104(4). The network interface 232 provides access to a network (e.g., LAN, Internet, etc.) and may be any of a wide variety of various wired or wireless interface components including an Ethernet card, a modem, a Bluetooth module, a cable modem, and the like.

The game console 102 has two dual controller support subassemblies 240(1) and 240(2), with each subassembly supporting two game controllers 104(1)-104(4). A front panel I/O subassembly 242 supports the functionality of the power button 112 and the eject button 114, as well as any LEDs (light emitting diodes) or other indicators exposed on the outer surface of the game console. The subassemblies 240(1), 240(2), and 242 are coupled to the module 214 via one or more cable assemblies 244.

Eight memory units 140(1)-140(8) are illustrated as being connectable to the four controllers 104(1)-104(4), i.e., two memory units for each controller. Each memory unit 140 offers additional storage on which games, game parameters, and other data may be stored. When inserted into a controller, the memory unit 140 can be accessed by the memory controller 202.

A system power supply module 250 provides power to the components of the gaming system 100. A fan 252 cools the circuitry within the game console 102.

A console user interface (UI) application 260 is stored on the hard disk drive 208. When the game console is powered on, various portions of the console application 260 are loaded into RAM 206 and/or caches 210, 212 and executed on the CPU 200. The console application 260 presents a graphical user interface that provides a consistent user experience when navigating to different media types available on the game console.

The game console 102 implements a cryptography engine to perform common cryptographic functions, such as encryption, decryption, authentication, digital signing, hashing, and the like. The cryptography engine may be implemented as part of the CPU 200, or in software stored in memory (e.g., ROM 204, hard disk drive 208) that executes on the CPU, so that the CPU is configured to perform the cryptographic functions.

The gaming system 100 may be operated as a standalone system by simply connecting the system to a television or other display. In this standalone mode, the gaming system 100 allows one or more players to play games, watch movies, or listen to music. However, with the integration of network connectivity made available through the network interface 232, the gaming system 100 may further be operated as a participant in a larger network gaming community.

Video games may be stored on various storage media for play on the game console. For instance, a video game may be stored on the portable storage disc 108, which is read by drive 106. Alternatively, the video game may be stored in hard disk drive 208, being transferred from a portable storage medium or downloaded from a network. During play, portions of the game are temporarily loaded into RAM memory 206, caches 210 and 212, and executed by the CPU 200. One particular video game of the shooter genre is described next.

Squad Command Interface

In a squad-based shooter video game, a game player issues commands to various squad characters. The commands instruct the characters on where to move and how to function in combat. The video game supports a squad command interface to facilitate player interaction with the characters. The squad command interface includes a squad status display and a command change user interface (UI). The squad status display is persistently depicted during game play to inform the player of the current commands being carried out by the characters. If the player wishes to issues a new command to one or characters, the player invokes the command change user interface that presents various command options from which to choose. These two components of the squad command interface are described separately below.

Squad Status Display

Figure 3:
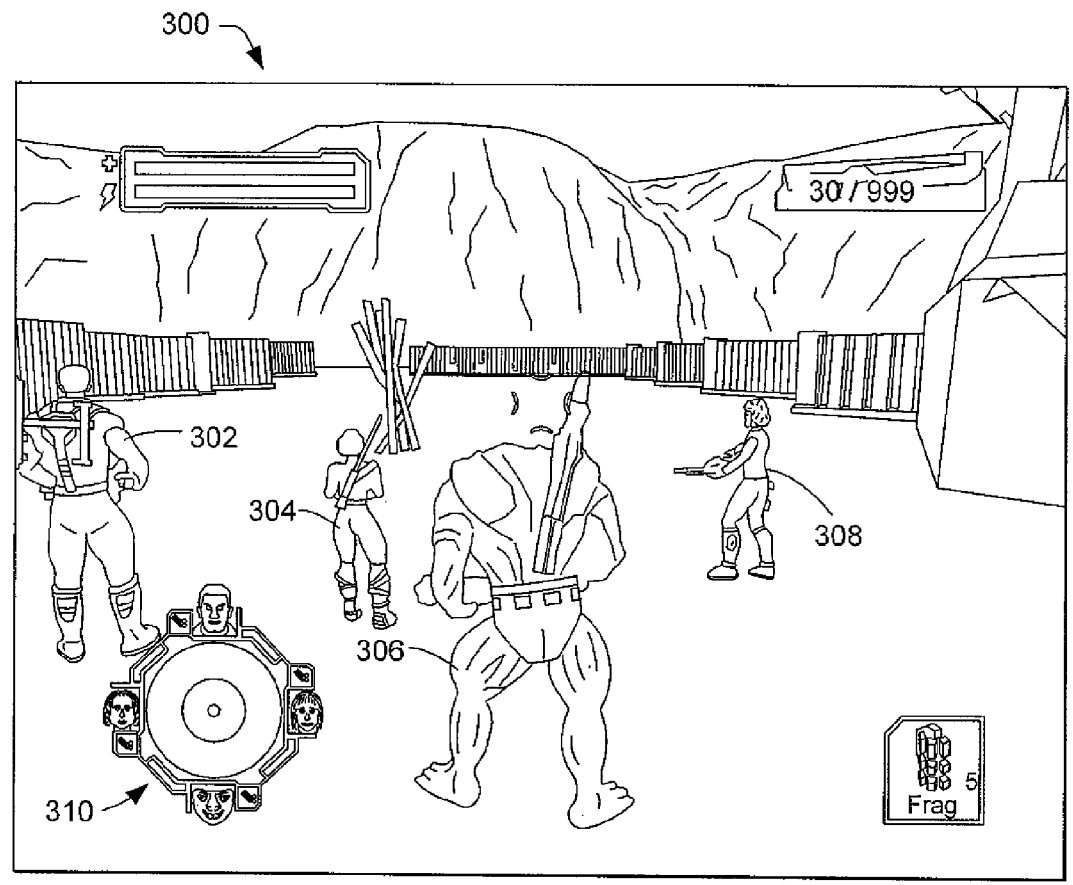
FIG. 3 illustrates an exemplary scene of the squad-based shooter video game, where a squad status display is presented in a lower left-hand corner of the screen to indicate a status of each squad character.
Figure 3:
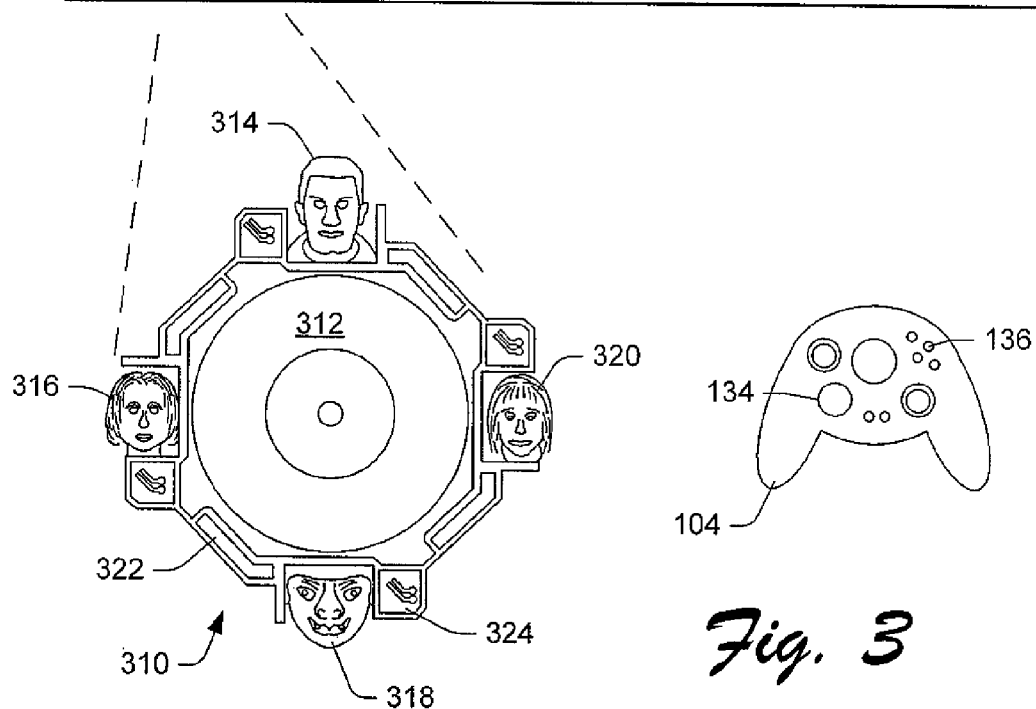

FIG. 3 shows an exemplary scene 300 from a squad-based shooter video game. This particular scene 300 is from a video game title, Brute Force, which is developed for Microsoft's Xbox® gaming system. In scene 300, a squad of four characters is illustrated, including a first character 302 named "Tex", a second character 304 named "Hawk", a third character 306 named "Brutus", and a fourth character 308 named "Flint". As is common in third person games, the player's viewpoint is taken at a position removed from each character. In this scene, a camera is positioned behind the characters and proximal to the Brutus character 306.

The squad command interface includes a squad status display 310 positioned in the lower left-hand portion of the scene 300. The squad status display 310 is persistently visible during combat action and is located in a non-focal region of the screen, such as the lower left-hand corner as shown. The status display 310 is integrated with a radar display 312 that indicates where various characters of the squad are located relative to one another. In the illustrated example, the squad status display 310 encircles the radar display 312 and depicts profile images of the four squad characters. The profiles include a first character profile 314 for the Tex character 302, a second character profile 316 for the Hawk character 304, a third character profile 318 for the Brutus character 306, and a fourth character profile 320 for the Flint character 308.

The squad status display 310 indicates which character is currently selected. In FIG. 3, the Brutus character 306 is selected as represented by a highlighted boundary around the Brutus character profile 318. When the Brutus character is selected, the camera viewpoint resides proximal to, and behind, the Brutus character 306 in the scene 300.

The four character profiles 314-320 on the squad status display 310 are mapped visually and spatially to a first actuator on the controller 104. In one implementation, the first actuator is the D-pad 134. A player can select a different character and change the camera viewpoint by actuating the D-pad 134 at distinct pad coordinates (i.e., north, west, south, east) that correspond to the four character profiles of Tex 314, Hawk 316, Brutus 318, and Flint 320. A double tap of the D-pad 134 allows the player to select a new character and simultaneously change the camera viewpoint in the scene. It is noted that the game may be configured to support selection of the characters using other actuators on the controller. For instance, in one implementation, a player can depress a button or trigger to cycle through the character profiles of the squad status display 310 in clockwise or counter-clockwise rotation.

The squad status display 310 has a health bar 322 associated with each character profile 314-320 to inform the player of the character's health as the battle mission progresses. In the illustrated implementation, the health bar 322 begins as a solid color bar, which represents a character that is healthy and unharmed. As the character is hit or injured during the mission, the health bar shrinks.

Figure 4:
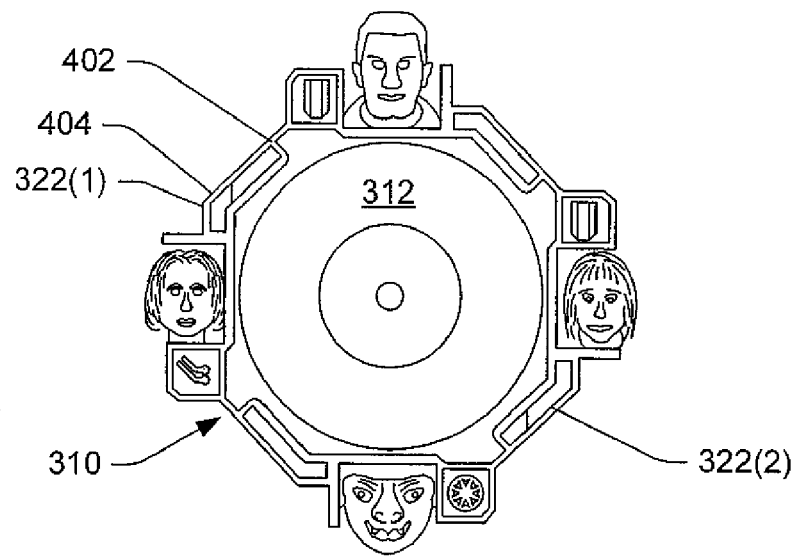
FIG. 4 shows an enlarged view of the squad status display to illustrate character health bars that represent the health/harm associated with each character.

FIG. 4 shows the squad status display 310 in which the character health bar 322(1) for the Hawk character 304 and the character health bar 322(2) for the Flint character 308 are diminished. More particularly, Hawk's health bar 322(1) has shrunk from full health point 402 to partial health point 404. Flint's health bar 322(2) has experienced similar change. Each character's health bar 322 may eventually disappear if that character sustains enough hits or combat injuries. If the health bar is exhausted, the character may be deemed out of commission for the remainder of the mission or "respawned" with a new life to continue play in the current mission.

With reference again to FIG. 3, the squad status display 310 also informs the player as to the current orders being carried out by the squad members. Each character has an associated current order icon 324. In this illustration, all four characters have the same order; namely, the "stand ground" command as represented by the three vertical bars in the current order icon 324. There are other commands in addition to the "stand ground" command, and each character may be assigned the same or different commands.

Figure 5:
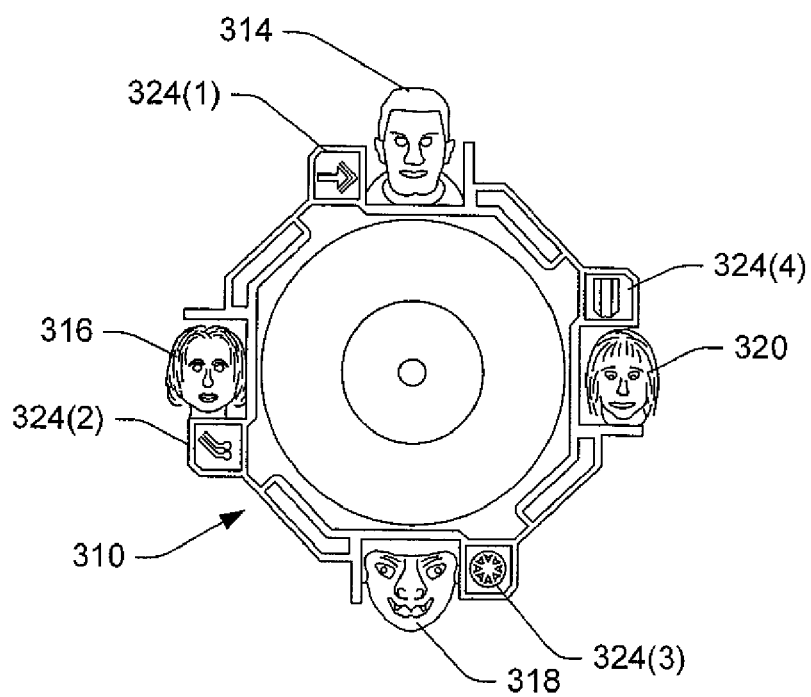
FIG. 5 shows an enlarged view of the squad status display to illustrate a current command being carried out by each character.

FIG. 5 shows the squad status display 310 in which each character has a different command. In the described implementation, the video game supports four different commands: "stand ground", "move to", "fire at will", and "cover me". The Tex character profile 314 has an associated current order icon 324(1) depicting a "move to" command. The "move to" command allows the player to reposition the Tex character 302 to another location in the scene. The "move to" command is graphically illustrated as a direction arrow. The Hawk character profile 316 has an associated current order icon 324(2) depicting a "cover me" command, which instructs the Hawk character 304 to provide protective gunfire and/or backup while another character is moving positions. The "cover me" command is illustrated as a pair of bent arrows. The Brutus character profile 318 has an associated current order icon 324(3) depicting a "fire at will" command, which instructs the Brutus character 306 to shoot whenever he deems it appropriate. The "fire at will" command is graphically represented by a circle of arrowheads inwardly trained on a center point. The Flint character profile 320 has an associated current order icon 324(4) depicting a "stand ground" command, which instructs the Flint character 308 to stay where she is located and not to advance without further instructions. The "stand ground" command is depicted as three vertical bars.

It is noted that this is just one representative configuration of a squad status display. The number of characters, their arrangement, and their mapping to the D-pad 134 may be modified in other implementation. For instance, in a different implementation, the status display may be configured with profiles of more than four characters and they might be selected by means other than the D-pad 134.

Command Change UI

Figure 6:
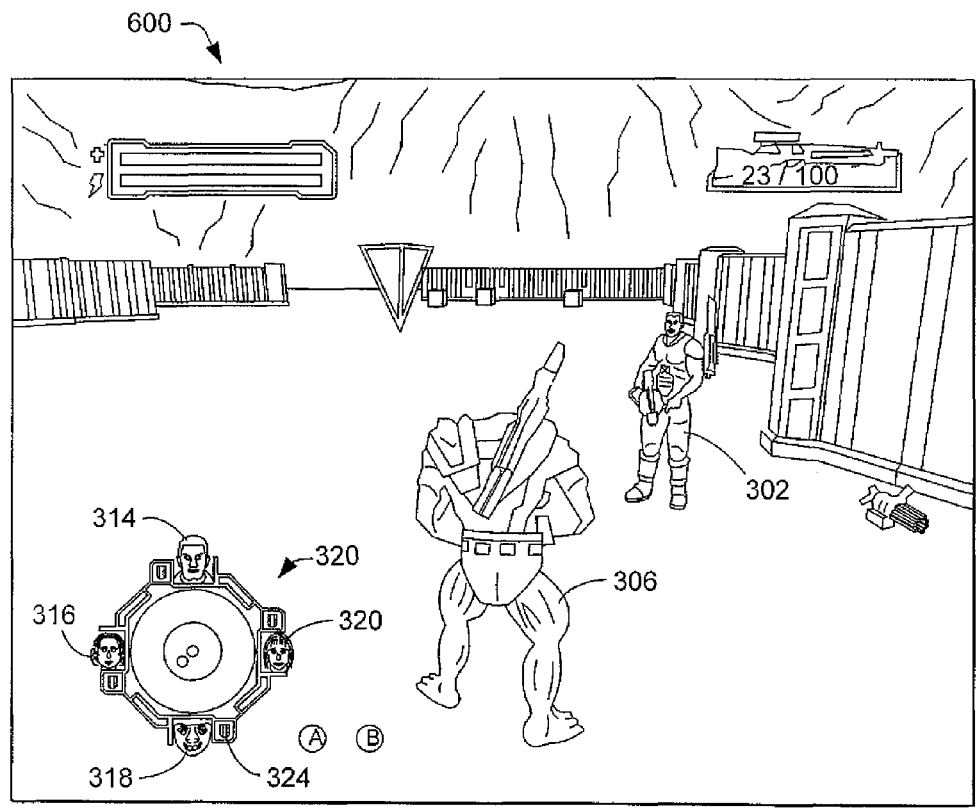
FIG. 6 shows another exemplary scene of the shooter video game to illustrate selection of characters via the squad status display.
Figure 6:
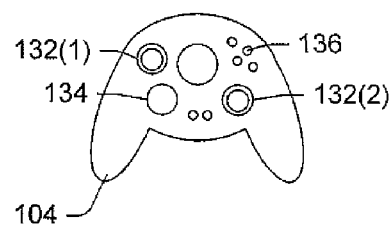

FIG. 6 shows another exemplary scene 600 from the squad-based shooter video game title Brute Force. In scene 600, the Tex character 302 and the Brutus character 306 are illustrated. The Hawk and Flint characters are not shown in this scene. As illustrated by the squad status display, all four characters of the squad are currently executing the "stand ground" command as indicated by the current order icon 324.

With the squad command interface, a player is able to issue new commands to one or more characters on the squad. To change commands, the player actuates the D-pad 134 on controller 104 to bring up the command change UI. More particularly, the player single taps the D-pad 134 to concurrently select a character and invoke the command change UI. To issue a command to Brutus 306, for example, the player presses once at the bottom or south portion of the D-pad 134 corresponding to the Brutus character profile 318 on the squad status display 310.

Figure 7:
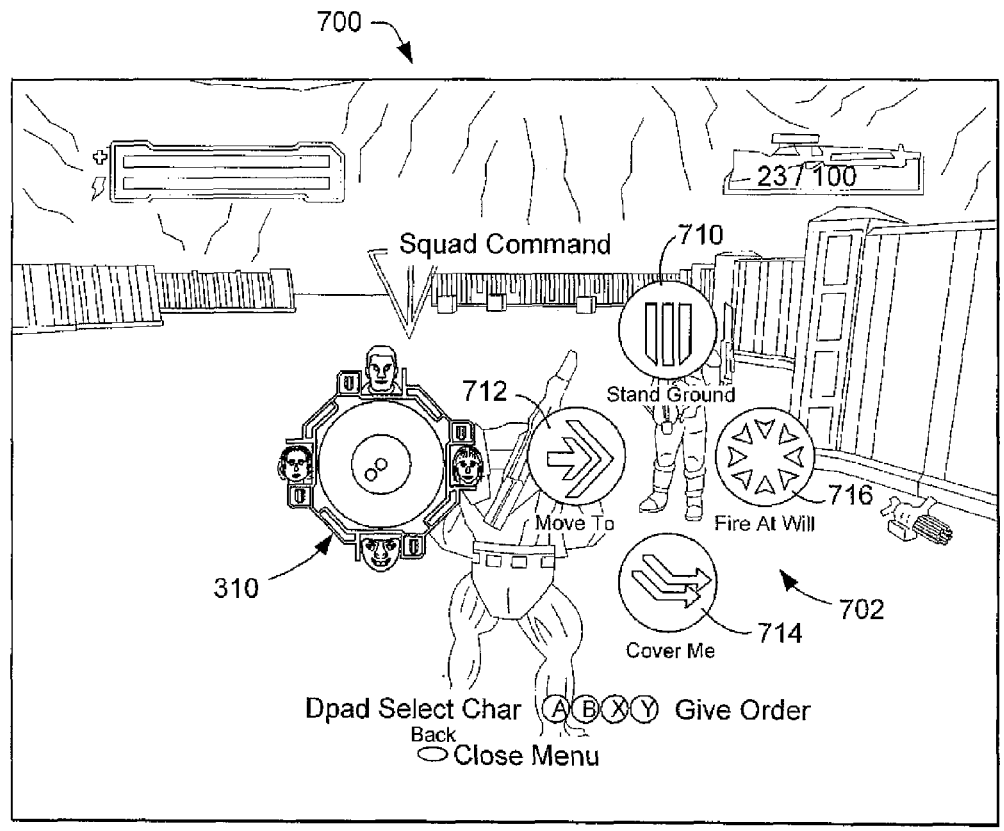
FIG. 7 shows a command change user interface (UI) that is invoked when a player wants to issue a new command to one or more characters.
Figure 7:
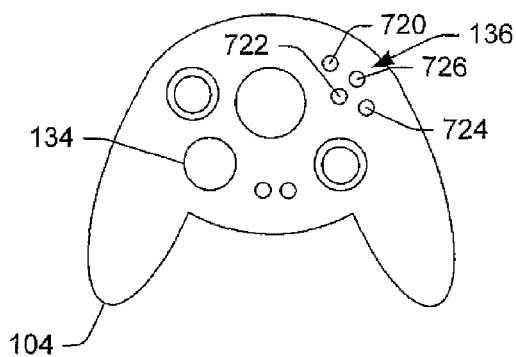

FIG. 7 shows the command change UI 700 that is presented when the player actuates the D-pad 134. The command change UI 700 is a partially transparent graphical user interface that overlays on the current scene. The command change UI 700 has an enlarged squad status display 310, with the radar display interior, positioned at center screen and adjacent to a command options menu 702 that contains various command options available to the player.

In the illustrated implementation, the command options menu 702 identifies four possible command options: a "stand ground" command option 710, a "move to" command option 712, a "cover me" command option 714, and a "fire at will" command option 716. The command options further depict the symbols associated with the commands that are depicted in the current order icon 324 of the status display 310, as described above with respect to FIGS. 3 and 5.

The command options 710-716 are arranged geometrically in a diamond orientation and are color coordinated to map visually and spatially to similarly arranged and colored surface buttons 136 on the game controller 104. More specifically, the "stand ground" option 710 is positioned atop the diamond-shaped options menu 702 and is colored in a first color (e.g., yellow) to map to an uppermost button 720. The "move to" option 712 resides to the left of the diamond-shaped options menu 702 and is colored in a second color (e.g., blue) to map to a leftmost button 722. The "cover me" option 714 is at the bottom of the options menu 702 and is colored in a third color (e.g., green) to map to a bottommost button 724. The "fire at will" option 716 resides to the right of the options menu 702 and is colored in a fourth color (e.g., red) to map to a rightmost button 726.

Once in the command change UI 700, the player can select one or more characters by single tapping the D-pad 134. In the illustrated example, the player has selected the Tex and the Hawk characters by tapping the north and west points on the D-pad 134. It is noted, however, that other actuators on the controller may be used to select the characters. In one implementation, the UI can be configured to cycle through the character profiles of the squad status display 310 upon actuation of a trigger, a thumbstick, or another button separate from the command buttons 136.

Once the character(s) are selected, the player can issue a command to all selected character(s) by pressing one of the surface buttons 136 that corresponds to the desired command. For instance, suppose the player wants to order the Tex and Hawk characters to "fire at will". While these characters are selected, the player simply presses the corresponding surface button 726 on the controller 104 to issue the command. In this manner, one button press enables a player to issue a common order to multiple characters.

When the command change UI 700 is invoked, the game can be optionally configured to pause action and give the player time to select character(s) and issue a command. This allows novice players more time to view and select the characters and commands without any penalty for being slow or unfamiliar with the game. Expert players who move skillfully and quickly in and out of the command change UI 700 will experience essentially continuous action with no noticeable pause.

Figure 8:
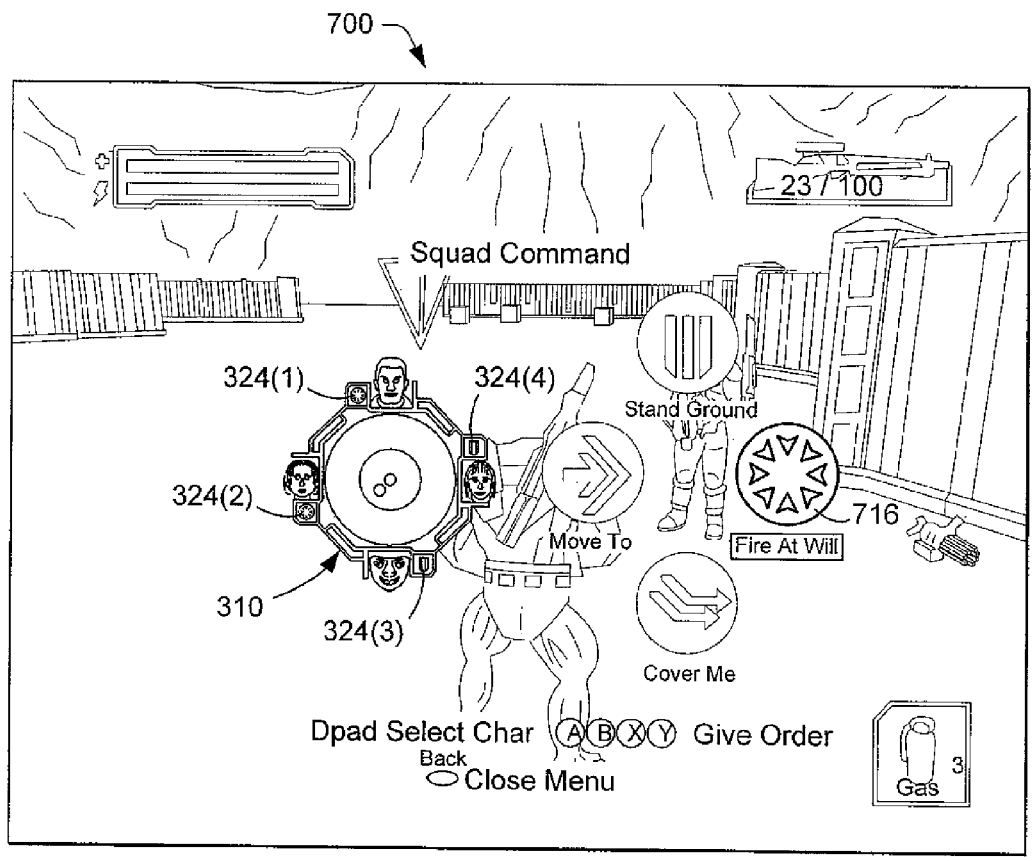
FIG. 8 shows the command change UI after issuing a particular command.
Figure 8:
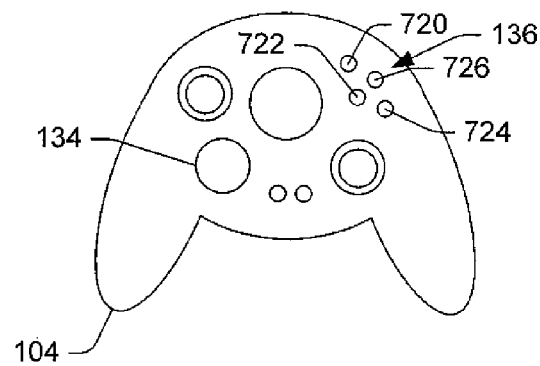

FIG. 8 shows the command change UI 700 immediately after selection of the "fire at will" command 716. Notice that the current order icons 324(1) and 324(2) associated with Tex and Hawk, respectively, has been changed from "stand ground" to "fire at will", as represented by the "fire at will" symbol.

When the player issues the "fire at will", "stand ground", or "cover me" command, the command change UI 700 automatically closes after the command is issued. The player is returned to the scene and the squad status display is returned to the lower left-hand corner. This is essentially shown in FIG. 6, with the exception that the current order icons for the Tex and Hawk character profiles 314 and 316 would now exhibit the "fire at will" command.

A special case arises when the "move to" command is issued. In this case, a destination locator is depicted on the screen to identify the location to where the one or more characters are to move. The player can move the destination locator to a desired location using the thumbsticks on the controller 104 and then select that location by pressing one of the surface buttons on the controller 104. In one implementation, the destination locator is shaped as an inverted pyramid, although other shapes, icons, or indicia may be used. Once the player chooses a location, the command change UI 700 is closed and the player is returned to the action. The selected characters that were given the "move to" command begin moving to the chosen location.

The squad command interface thus provides an effective and efficient mechanism for facilitating player interaction with the character. One or more characters can be easily selected with corresponding taps on the D-pad and then a command can be issued with a single press of a surface button. This allows the player to give a common order simultaneously to multiple characters with one button press.

Figure 9:
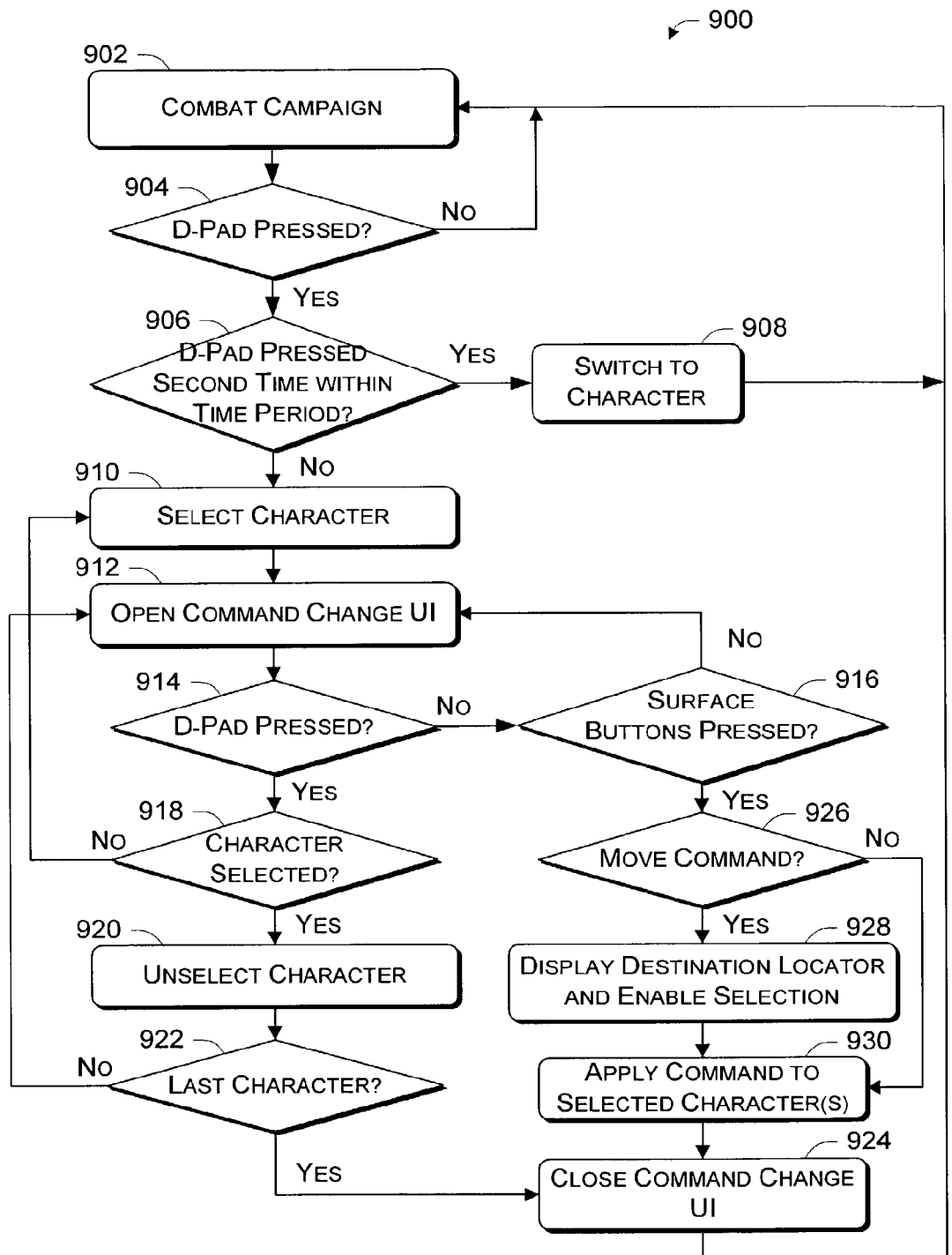
FIG. 9 shows an exemplary process for issuing commands to one or more characters.

FIG. 9 shows a process 900 for issuing commands to one or more characters. The process 900 is illustrated as a series of blocks that represent individual operations or acts performed by the gaming system in response to executing the video game. The process 900 may be implemented in any suitable hardware, software, firmware, or combination thereof. In the case of software and firmware, process 900 represents a set of operations implemented as computer-executable instructions stored in memory and executable by one or more processors.

At block 902, the video game supports an ongoing combat campaign. Depending on the game configuration, the player is orchestrating a squad of characters through one or more missions. When the player wishes to issue a command to one or more characters in the squad, the player depresses the D-pad 134 on the controller 104. Accordingly, at block 904, the process detects whether the D-pad is pressed. If no actuation is detected (i.e., the "No" branch from block 904), the game continues with the ongoing campaign.

If the D-pad is pressed (i.e., the "Yes" branch from block 904), the process determines whether a second tap of the D-pad is received within a brief time period (block 906). The duration of the time period is configurable, but suitable time periods range from a one tenth to one quarter of a second. If a second press is detected before the time period expires (i.e., the "Yes" branch from block 906), the process interprets the players action as wanting to switch characters and camera viewpoints. Hence, at block 908, the game switches to the new character selected by the player and the camera viewpoint changes.

If no second tap is received within the time period (i.e., the "No" branch from block 906), the character associated with the tapped point on the D-pad is selected (block 910) and the command change UI is instantly opened (block 912). This is shown, for example, in transition from FIG. 6 to FIG. 7 where the player taps the D-pad once to select a character (e.g., Hawk) and bring up the command change UI 700 in FIG. 7.

Once the command change UI 700 is opened, the game awaits input from the player via the D-pad 134 or one of the surface buttons 136. The player can select one or more characters using the D-pad 134 and/or issue a command to the selected character(s) using the surface buttons 136. Accordingly, at blocks 914 and 916, the game determines whether the D-pad or the surface buttons have been pressed. The command change UI remains upon until either the D-pad or one of the surface buttons is pressed (i.e., the loop formed by the "No" branches from blocks 914 and 916).

Depression of the D-pad 134 alternately selects or unselects characters on the squad. Accordingly, upon depression of the D-pad (i.e., the "Yes" branch from block 914), it is determined whether the character corresponding to the tapped location of the D-pad 134 is already selected (block 918). If not (i.e., the "No" branch from block 918), the character is selected (block 910) and the command change UI is updated to depict a second character as being selected (block 912). Conversely, if the character is already selected (i.e., the "Yes" branch from block 918), the character is unselected (block 920). At block 922, a determination is made as to whether that character is the last of the selected characters, leaving all characters unselected. If it was not the last character unselected (i.e., the "No" branch from block 922), the command change UI is updated to show the character unselected. If it was the last character (i.e., the "Yes" branch from block 922), the command change UI is closed (block 924) and the player is returned to the combat campaign (block 902).

Upon depression of a surface button (i.e., the "Yes" branch from block 916), it is initially determined whether the "move to" command was issued (block 926). This is accomplished by sensing whether the surface button 722 corresponding to the "move to" command option 712 (see FIG. 7) is depressed. If it is (i.e., the "Yes" branch from block 926), a destination locator is depicted and the player is enabled to move and confirm placement of the destination locator (block 928). If a command other than the "move to" command is issued (i.e., the "No" branch from block 926) or after the player places the destination locator (block 928), the command issued to the one or more selected characters are applied (block 930). At block 924, the command change UI is closed and the player is returned to the combat campaign (block 902).

Thereafter, the squad status display is once again returned to the lower left-hand corner of the scene. The action continues with the squad characters carrying out their associated commands, as represented by the current command icon in the squad status display.

Character Status Icons

Another feature supported by the squad command interface is a set of character status icons that appear when characters enter certain modes of operation. In the described implementation, there are three modes and hence, there are three corresponding status icons that are individually and selectively depicted as part of the squad status display 310. The three status icons include a sniping icon to represent a sniper mode, a special ability icon to represent when a character has a special ability, and a talking icon to represent a talking mode. These status icons are merely representative, and more or less status icons for different character modes may be employed in other implementations.

Figure 10:
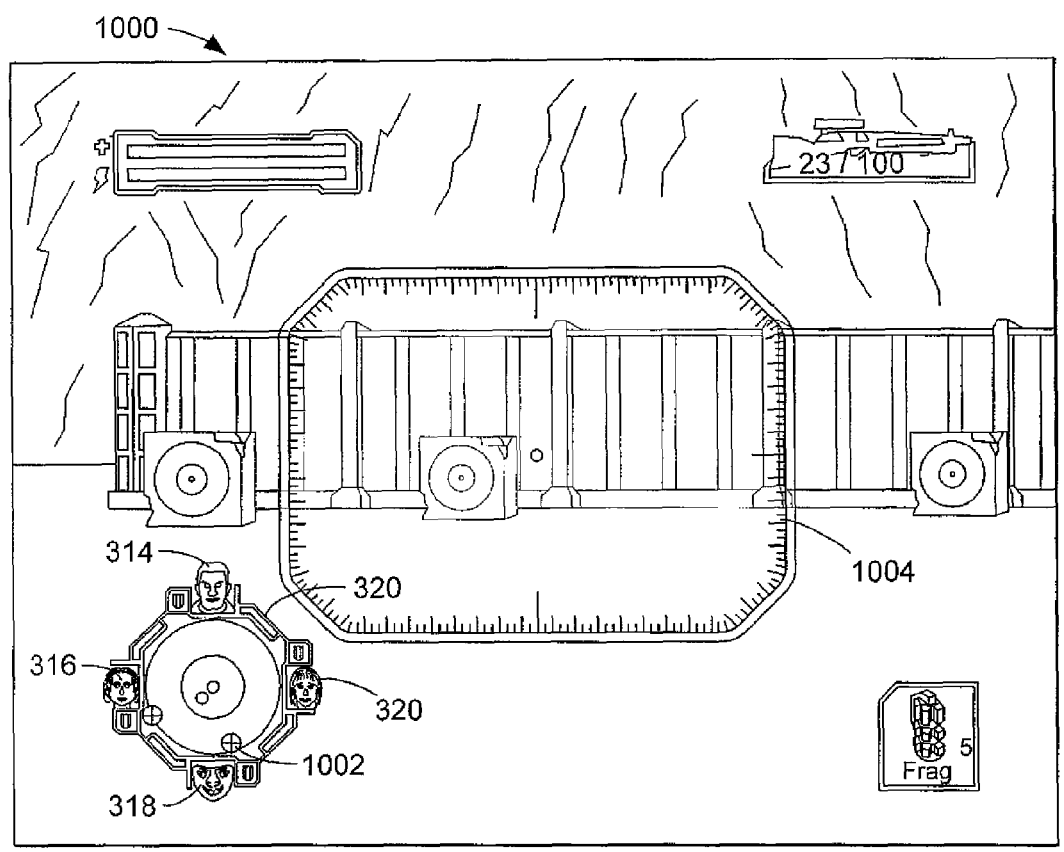
FIG. 10 shows an exemplary screen display when a character is in a sniper mode. The squad status display depicts an icon representative of this sniper status.

FIG. 10 shows an example screen display 1000 when a character is in sniper mode. In this example, the Hawk and Brutus characters are operating in sniper mode, as indicated by a sniping icon 1002 illuminated next to the Hawk character profile 316 and the Brutus character profile 318 in the squad status display 310. The sniping icon 1002 is illustrated as a cross-hair sight. When a selected character is in sniper mode, the main viewing area is changed visually to exhibit an appearance of viewing through a weapon-mounted scope. A scope window 1004 appears on the screen. Objects within the scope window 1004 are rendered sharply and clearly, while objects outside the scope window 1004 are slightly blurred.

Figure 11:
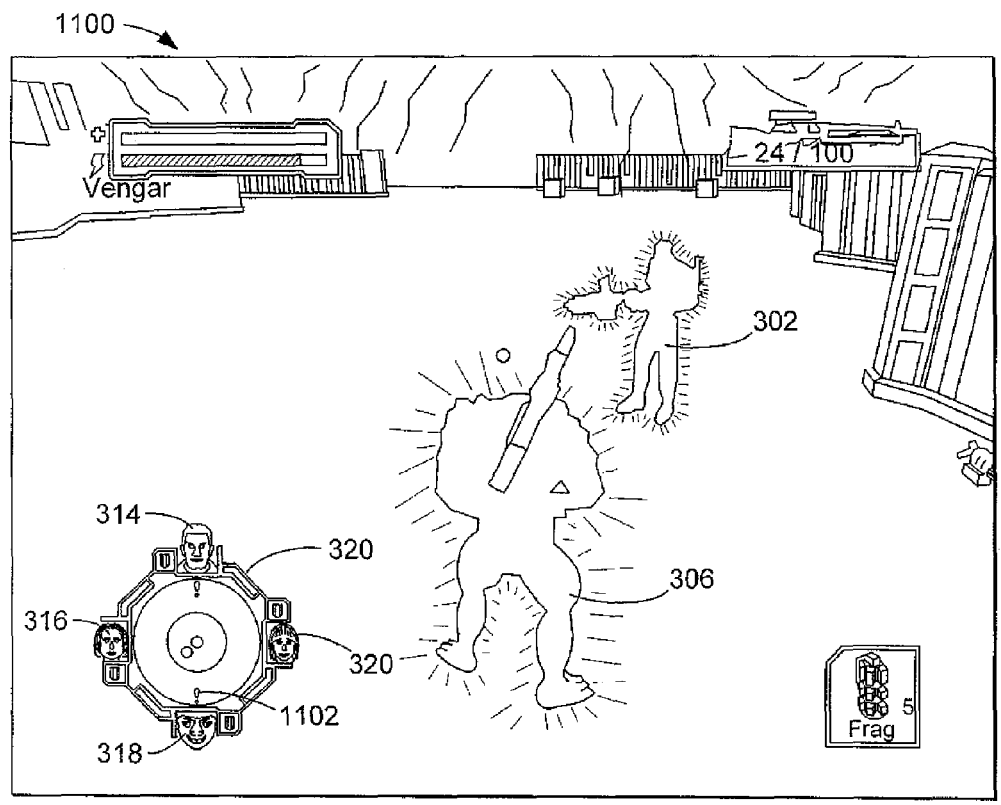
FIG. 11 shows an exemplary screen display when a character is operating with a special ability. The squad status display depicts an icon representative of this special ability mode.

FIG. 11 shows an example screen display 1100 when a character has a special ability. Each character has its own special ability. In this example, the Tex character's special ability is to hold and fire more than one weapon. The Tex character 302 is shown holding two weapons 1104 and 1106. The Brutus character's special ability allows him to see living things more clearly, regenerate health, be resistant to damage, and kill his enemies in a supercharged attack. Hence, the screen display 1100, which is taken from the perspective of the Brutus character 306, shows the living members in a different manner, as if looking through Brutus' eyes. The characters are rendered in an infernal coloring (i.e., a mixture of orange, red, and yellow) against a gray background. The squad status display 310 indicates that the Tex and Brutus characters are utilizing their respective special abilities by depicting a special ability icon 1102 next to the Tex character profile 314 and the Brutus character profile 318. The special ability icon 1102 is illustrated as an exclamation point "!".

Figure 12:
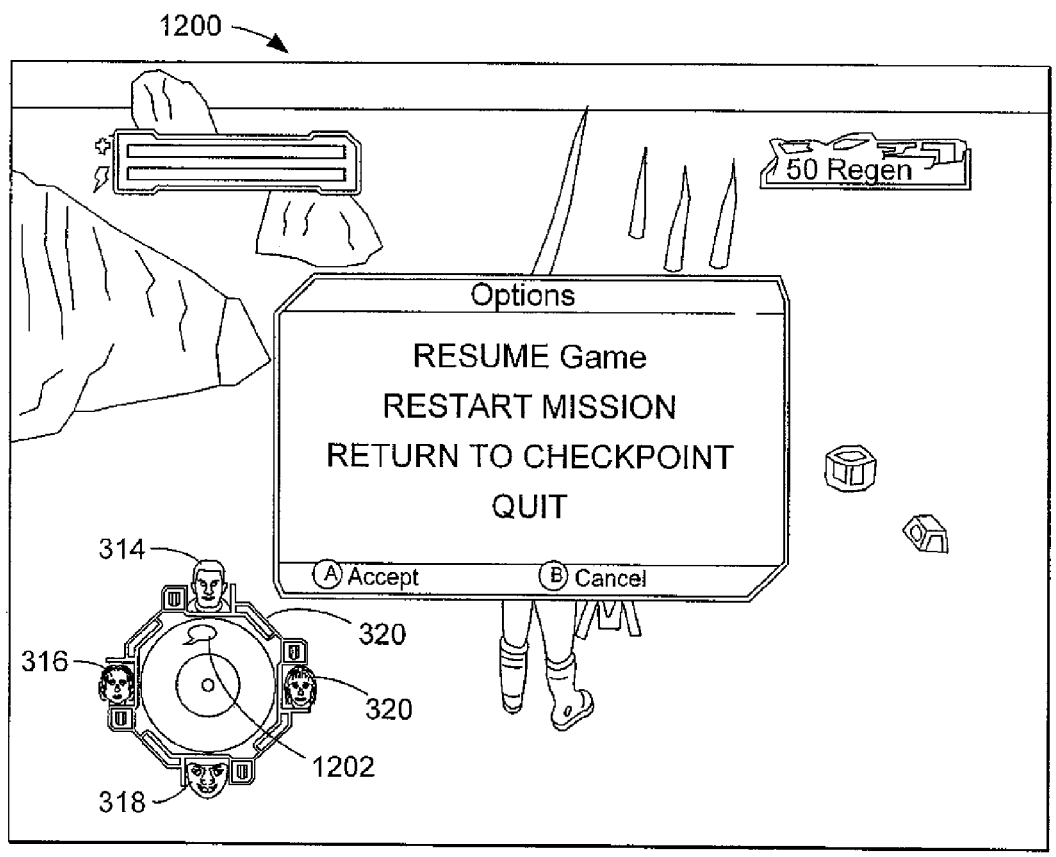
FIG. 12 shows an exemplary screen display when a character is talking. The squad status display depicts an icon representative of the talking mode.

FIG. 12 shows an example screen display 1200 when a character is in a talking mode. In this example, the Tex character is talking, as indicated by a talking icon 1202 illuminated next to the Tex character profile 314 in the squad status display 310. The talking icon 1202 is illustrated as a cartoonlike speaking bubble. When a selected character is in talking mode, the game facilitates communication between the player and the character. When a character is talking, a communication dialog (not shown) is depicted on the screen.

Multiplayer Split Screen

The squad-based shooter game supports multiple players. In the standalone setting, a gaming system equipped four controllers can support up to four players. When multiple players participate, the screen is split to accommodate the different game views for the various players. When the screen is split, the amount of viewing space available for each player is significantly diminished. The squad command UI is therefore slightly modified to accommodate this smaller viewing space.

Figure 13:
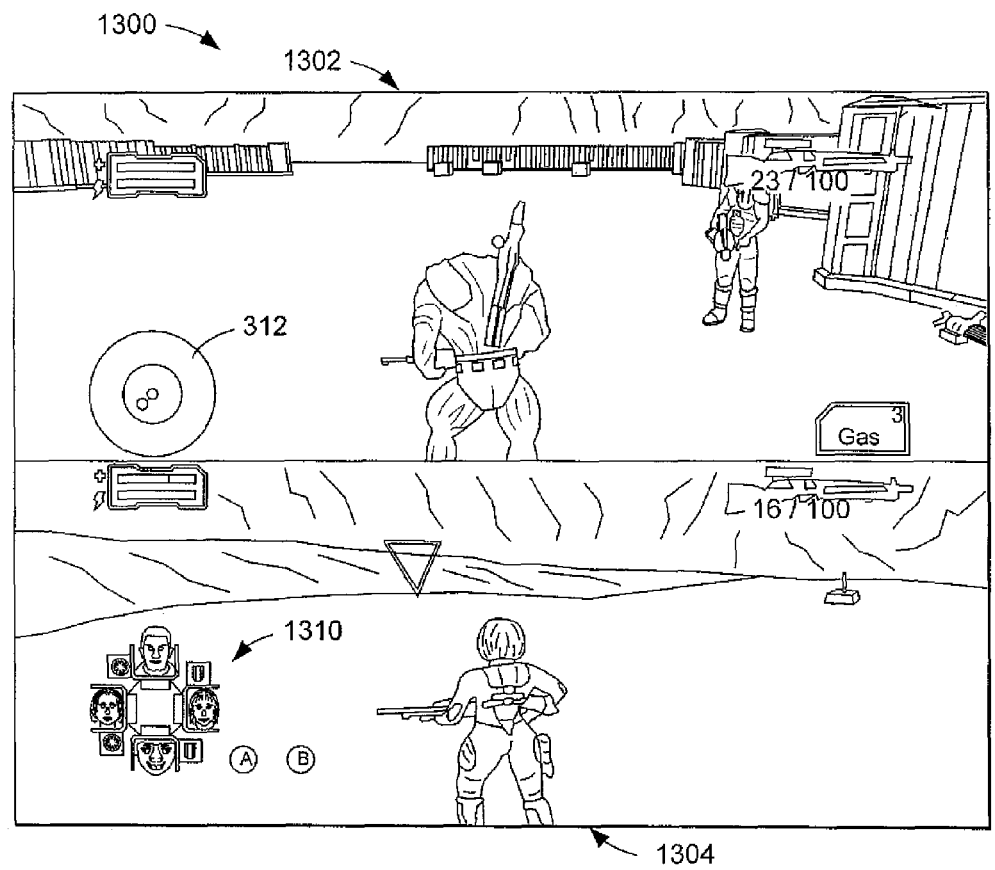
FIG. 13 shows an exemplary a split-screen display when two players are playing.
Figure 13:
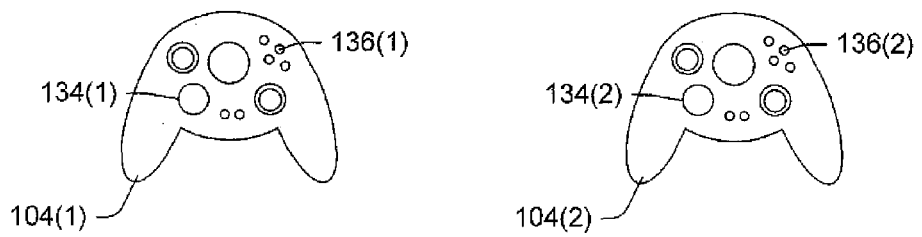

FIG. 13 shows a split-screen display 1300 when two players are playing. The display 1300 has an upper panel 1302 for a first player using controller 104(1) and a lower panel 1304 for a second player using controller 104(2). This association of panels with controllers is merely representative for discussion purposes. A player need not use controllers in any particular order. For example, a player using a controller inserted in the fourth slot on the game console could play alone, or be joined later in the game by a player using a controller inserted into the first slot. In one implementation, the screen panels are related to the controller slot positions. So, in the case above, the player who joined later by attaching the game controller to the first slot would be given the upper panel 1302, whereas the first player using the fourth slot would be given the lower panel 1302 In multi-player operation, the squad status display is not persistently displayed in order to conserve space. This is illustrated by the upper panel 1302, where the squad status display is not shown, leaving only the radar display 312. However, as represented in lower panel 1304, when the second player wants to switch characters or issue a new command, the second player taps on the D-pad 134(2) to invoke a reduced-size squad status display 1310.

The reduced-size squad status display 1310 is a reduced or minimized version of the squad status display 310 of FIG. 3. It includes the character profiles arranged to map onto the D-pad actuator, the current command icons, and the character health bars. In the same was as described above, the player can select a new character using the D-pad 134(2) or tap a second time on a selected character to invoke the command change UI.

Figure 14:
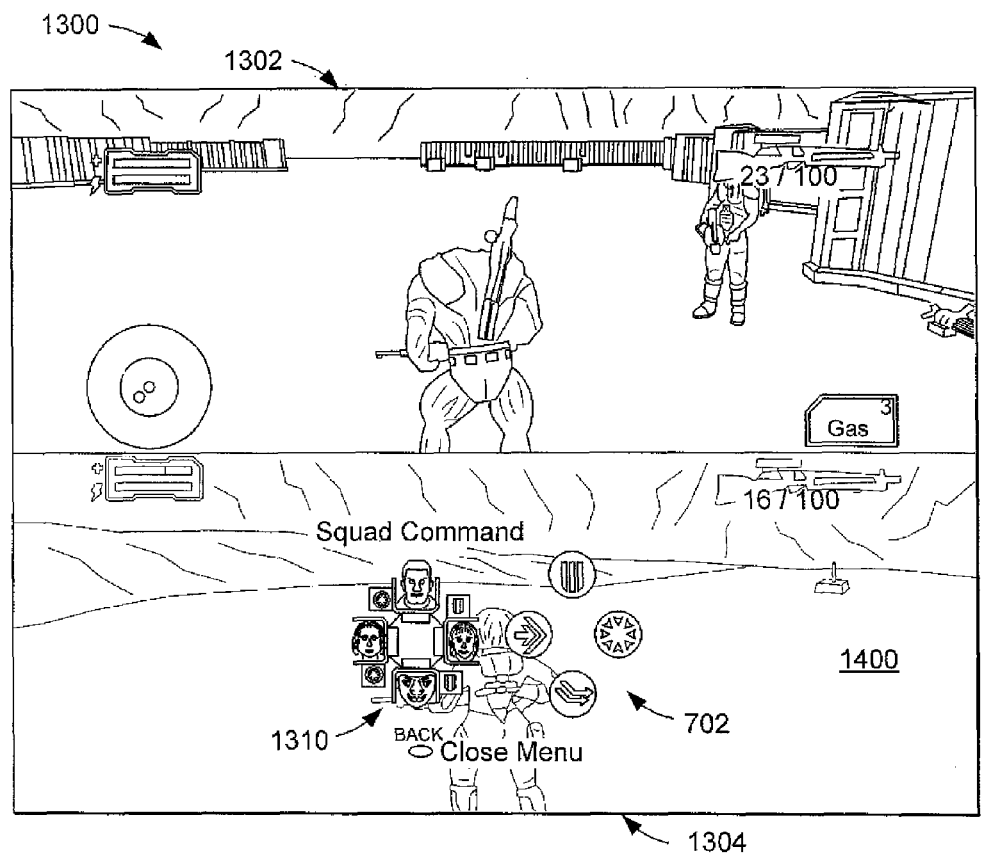
FIG. 14 shows the split-screen display when one player is issuing a new command via the command change UI.
Figure 14:
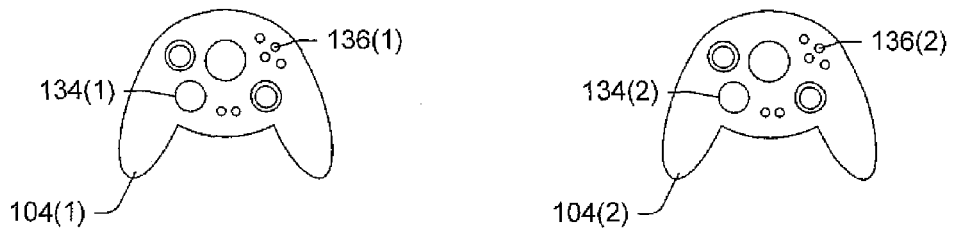
Figure 15:
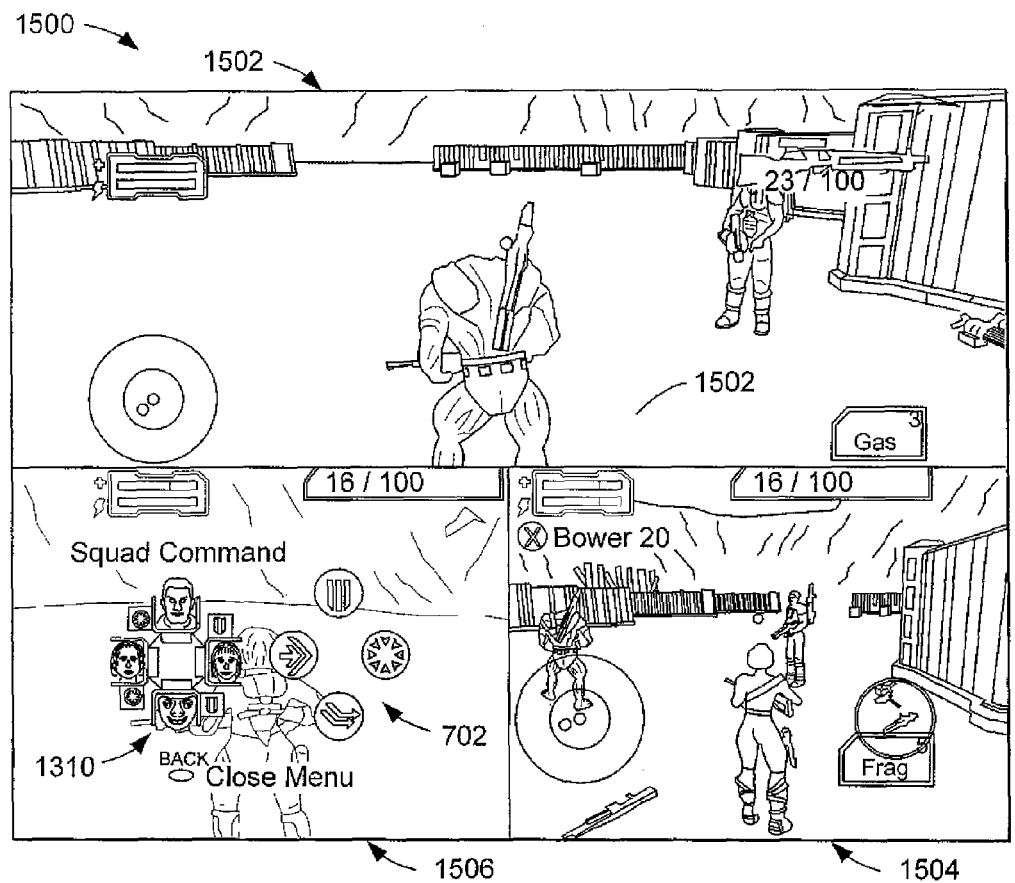
FIG. 15 shows an exemplary three-way-split-screen display when three players are playing.
Figure 15:
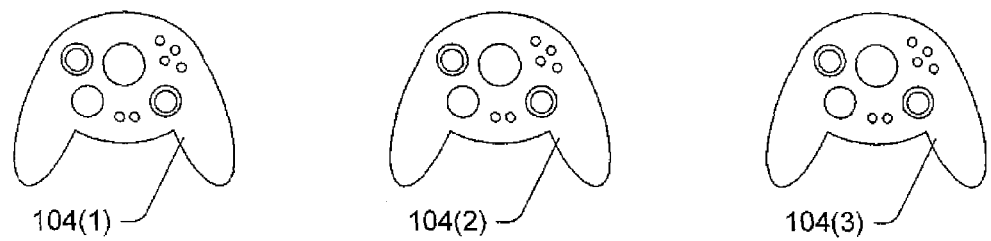

FIG. 14 shows the split-screen display 1300 in which a reduced-size command change UI 1400 is opened in the lower panel 1304. It is similar in layout to the full-size command change UI 700. The reduced-size command change UI 1400 has the reduced-size squad status display 1310 disposed adjacent to the command options menu 702. At this point, the second player can select another character by depressing the D-pad 134(2) or issue a command by pressing one of the surface buttons 136(2).

FIG. 14 shows another example of a split-screen display 1500 when three players are playing. Split-screen display 1500 has an upper panel 1502 for a first player using controller 104(1), a lower right-hand panel 1504 for a second player using controller 104(2), and a lower left-hand panel 1506 for a third player using controller 104(3).

In this example illustration, the third player has invoked the reduced-size command change UI 1400, which is opened on the lower left-hand panel 1506. The reduced-size command change UI 1400 positions the reduced-size squad status display 1310 along side of the command options menu 702.

Conclusion

The squad command interface allows game players to issue commands to a squad of characters in an efficient and intuitive manner. Players can switch among squad members, issue individual commands to individual characters, or provide a single order to multiple characters with few controller actuations and without use of cumbersome pull down menus. This allows the player to remain focused on the action rather than being distracted during order issuing processes.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. One or more computer-readable hardware storage media, embodying computer-readable instructions which, when executed by one or more processors, provide a user interface, configured to display on a display device, for a squad-based shooter video game in which a player controls a squad of multiple characters, comprising:
   a radar display to indicate where various characters of the squad are located relative to one another; and
   a squad status display integrated with the radar display to indicate a status of each squad character, wherein the squad status display defines an outer periphery, wherein the radar display is disposed visually over the squad status display and within the outer periphery, the squad status display being configured to depict profile images of the characters, the profile images being arranged on the display device to map visually to one or more actuators on a game controller, the actuators configured to enable selection of a profile image and invoke an associated command change user interface with a single action.

2. The computer-readable storage media of claim 1, wherein the radar display is circular, and the squad status display encircles the radar display.

3. The computer-readable storage media of claim 1, wherein the squad status display indicates a current command being carried out by each squad character.

4. The computer-readable storage media of claim 1, wherein the squad status display comprises a health bar graphic to indicate a relative health of the squad characters, the health bar graphic dynamically changing as a corresponding character is harmed during combat action.

5. The computer-readable storage media of claim 1, wherein the characters can be operated in different modes and the squad status display indicates when a corresponding character is operating in one of the modes.

6. The computer-readable storage media of claim 1, further comprising a command change user interface that is presented in response to player input to enable issuance of a command to one or more of the characters.

7. A computer-implemented method for providing a user interface, configured to display on a display device, for a squad-based shooter video game in which a player controls a squad of multiple characters, comprising:
   providing a radar display to indicate where various characters of the squad are located relative to one another; and
   providing a squad status display integrated with the radar display to indicate a status of each squad character, wherein the squad status display defines an outer periphery and wherein the radar display is disposed visually over the squad status display and within the outer periphery, the squad status display configured to depict profile images of the characters, the profile images being arranged on screen to map visually to one or more actuators on a game controller, the actuators configured to enable selection of a profile image and invoke an associated command change user interface with a single action.

8. The method of claim 7, wherein the radar display is circular, and the squad status display encircles the radar display.

9. The method of claim 7, wherein the squad status display indicates a current command being carried out by each squad character.

10. The method of claim 7, wherein the squad status display comprises a health bar graphic to indicate a relative health of the squad characters, the health bar graphic dynamically changing as a corresponding character is harmed during combat action.

11. The method of claim 7, wherein the characters can be operated in different modes and the squad status display indicates when a corresponding character is operating in one of the modes.

12. The method of claim 7, further comprising providing a command change user interface that is presented in response to player input to enable issuance of a command to one or more of the characters.

13. A computer-implemented method for a console-based video game system having at least one controller, wherein the method is performed in conjunction with a squad-based shooter video game in which a player controls a squad of characters, the method comprising:

persistently presenting on a display device, during game action, a squad status display to inform the player of a status of each character in the squad, the squad comprising at least three characters, the squad status display having character profile images for each character in the squad, each character profile image being located on a perimeter of a radar display and corresponding to a different direction on a directional actuator on the controller from all other characters in the squad;

persistently presenting on the display device, during the game action, the radar display visually integrated within the squad status display, the radar display configured to indicate locations of various characters in the squad relative to one another; and selectively presenting on the display device, in response to player actuation of the controller, a command change user interface to facilitate selection of one or more characters and issuance of a command to the one or more selected characters.

14. The method of claim 13, wherein the squad status display indicates a current command being carried out by each character in the squad.

15. The method of claim 13, wherein the squad status display indicates a health of each character in the squad.

16. The method of claim 13, wherein the squad status display indicates when a character in the squad is operating in a special mode.

17. The method of claim 13, wherein the command change user interface comprises a first graphical region to enable player selection of the one or more characters and a second graphical region adjacent to the first graphical region to enable issuance of the command to the one or more selected characters.

18. The method of claim 17, a wherein the first graphical region comprises the character profile images of the characters arranged to visually and spatially map to one or more first actuators on the controller and the second graphical region comprises icons representing possible commands arranged to visually map to one or more second actuators on the controller.

19. The method of claim 13 further comprising issuing the command to the one or more selected characters in response to a single actuation of a different actuator on the controller.

* * * * *